(12) United States Patent
Singh

(10) Patent No.: US 7,251,401 B2
(45) Date of Patent: Jul. 31, 2007

(54) FIBER COATING PROCESSING AND SLITTING FOR NON-CONFINED LIGHT LEAKAGE

(75) Inventor: Rajminder Singh, Shrewsbury, MA (US)

(73) Assignee: Matshsita Electric Industrial Co., Ltd., Osaka (JP)

( * ) Notice: Subject to any disclaimer, the term of this patent is extended or adjusted under 35 U.S.C. 154(b) by 92 days.

(21) Appl. No.: 11/228,368

(22) Filed: Sep. 16, 2005

(65) Prior Publication Data

US 2007/0065083 A1    Mar. 22, 2007

(51) Int. Cl.
G02B 6/02    (2006.01)

(52) U.S. Cl. .................. 385/123; 385/128; 385/48

(58) Field of Classification Search ........... 385/123, 385/128, 48
See application file for complete search history.

(56) References Cited

U.S. PATENT DOCUMENTS

| | | | | |
|---|---|---|---|---|
| 4,778,991 A | * | 10/1988 | Nozaki et al. | 250/235 |
| 5,257,340 A | * | 10/1993 | Kaplan | 385/128 |
| 5,436,991 A | * | 7/1995 | Sunagawa et al. | 385/37 |
| 5,528,399 A | * | 6/1996 | Izumi et al. | 349/116 |
| 5,982,959 A | * | 11/1999 | Hopenfeld | 385/12 |
| 6,666,590 B2 | | 12/2003 | Brosnan | |
| 6,751,380 B1 | * | 6/2004 | Imamura et al. | 385/37 |
| 6,950,576 B1 | * | 9/2005 | Grubsky et al. | 385/37 |
| 2002/0097962 A1 | * | 7/2002 | Yoshimura et al. | 385/50 |
| 2004/0164418 A1 | | 8/2004 | Suglura et al. | |
| 2007/0065083 A1 | * | 3/2007 | Singh | 385/126 |

OTHER PUBLICATIONS

"Tapered Fibers for UV and Near I.R.," TAP Series, pp. 1-2, Oxford Electronics Limited, oxford-electronics.com, no data.

Suganda Jutamulia, Fiber Optics Online News, pp. 1-3, Fiberopticsonline.com, no data.

"Nanoptics, Inc.," Fiber Optic Tutorial, Figures 1-2, www.nanoptics.com, no data.

* cited by examiner

*Primary Examiner*—K. Cyrus Kianni
(74) *Attorney, Agent, or Firm*—RatnerPrestia

(57) ABSTRACT

An optical fiber and methods of processing and manufacturing an optical fiber comprising a core, a cladding and a coating covering a segment of the cladding proximate to an end of the optical fiber are presented where patterned apertures are provided in the coating such that a portion of light propagating in the cladding escapes through the patterned apertures of the coating. The patterned apertures allow non-confined light to escape from the cladding in the coating region to provide reduced absorption of the non-confined light by the coating.

12 Claims, 6 Drawing Sheets

FIBER COATING PROCESSING AND SLITTING FOR NON-CONFINED LIGHT LEAKAGE

FIELD OF THE INVENTION

The present invention concerns optical fibers, particularly a method for removing excess power from a coated fiber end and an aperture patterned coated fiber optical fiber end.

BACKGROUND OF THE INVENTION

An optical fiber is typically attached in at least two places within optical packages. An endface of an optical fiber is typically attached in front of an optical device emitting light, such as a diode laser. The optical fiber may also be held in place at a feedthrough point in the optical package, so that the package may be sealed and prevent against atmospheric leakage into and out of the package. The optical fiber end within the optical package is typically metallized for attachment and sealing of the optical package. The end of an optical fiber is typically soldered in place so that it may be precisely aligned with a diode laser and held in this position for a number of years.

Optical packages vary and thus attachment points for an optical fiber may vary with an optical package. Metallization is typically provided to a significant portion of the optical fiber end in the manufacturing process. In terms of manufacturing, this allows for use of the same optical fiber with different optical packages and/or light sources. Thus, the optical fiber may be soldered at any position along the metallization depending at least on the optical package.

SUMMARY OF THE INVENTION

The present invention is embodied in an optical fiber comprising a core having a first index of refraction, a cladding surrounding the core and having an index of refraction less than the index of refraction of the core and a coating covering the cladding. The coating is located in a segment proximate to an end of the optical fiber and has patterned apertures such that a portion of light propagating into the cladding escapes through the patterned apertures of the coating. The patterned apertures tend to reduce absorption of the portion of light by the coating.

The present invention is also embodied in an optical fiber for receiving light from a source of light. The optical fiber comprises a core for receiving light from the source of light and having a first index of refraction and a cladding surrounding the core having an index of refraction less than the index of refraction of the core. The optical fiber further comprises a coating covering the cladding in a segment proximate to an end of the fiber and having patterned apertures. The end of the optical fiber has an edge adjacent to the source of light and the patterned apertures are configured to allow a portion of the light to escape through the coating such that reduced absorption of the portion of light occurs in the coating.

The present invention is further embodied in a method of processing an optical fiber comprising a core having a refractive index, a cladding surrounding the core having an index of refraction less than the index of refraction of the core and a coating on the surface of a segment of the cladding, the segment proximate to an end of the optical fiber. The method selectively removes portions of the coating to provide patterned apertures in the coating.

The present invention is further embodied in a method of manufacturing an optical fiber. The method comprising the steps of providing a core having a refractive index and forming a cladding surrounding the core having an index of refraction less than the index of refraction of the core. The method further comprising applying an aperture patterned coating to a surface of a segment of the cladding proximate an end of the optical fiber.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1A:
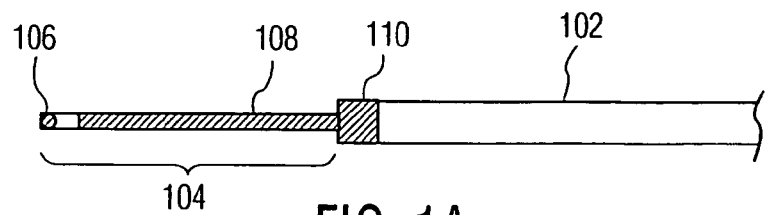
FIG. 1a (Prior Art) is a side view of a lensed tip metallized optical fiber end portion with a fiber buffer for coupling within an optical package.

Referring now to the drawing, in which like reference numbers refer to like elements throughout the various figures that comprise the drawing, FIGS. 1a-d show examples of metallized optical fiber ends according to the prior art. An optical fiber 102 may have an end 104 that is typically metallized 108 for placement within an optical package (not shown) for alignment with, for example, a diode laser (not shown).

FIG. 1a illustrates a known in the art optical fiber 102 where end 104 is metallized 108 to a lensed tip 106. Lensed tip 106 may be lensed for focusing optical power from a diode laser as described below. Optical fiber 102 may also include a fiber buffer 110 between fiber end 104 and the remaining length of optical fiber 102.

Figure 1B:
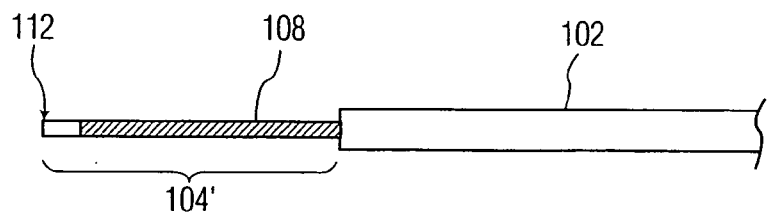
FIG. 1b (Prior Art) is a side view of a flat tip metallized optical fiber end portion for coupling within an optical package.

FIG. 1b illustrates another common in the art optical fiber end 104'. A known in the art flat tip 112 may be used with metallization 108 applied the length of optical fiber end 104' to flat tip 112.

Figure 1C:
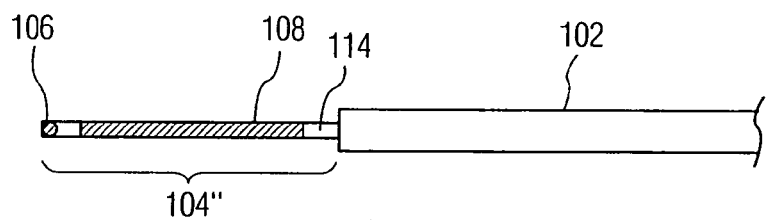
FIG. 1c (Prior Art) is a side view of a lensed tip partially metallized optical fiber end portion for coupling within an optical package.
Figure 1D:
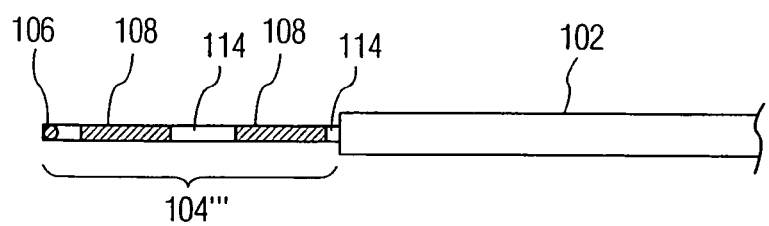
FIG. 1d (Prior Art) is a side view of a second lensed tip partially metallized optical fiber end portion for coupling within an optical package.

FIGS. 1c and 1d illustrate two common in the art optical fiber ends 104" and 104''', respectively. In these examples, metallization 108 does not extend along the length of the optical fiber ends 104" and 104'''. FIGS. 1c and 1d illustrate different places for exposing the bare cladding 114. In both of these examples a lensed tip 106 is illustrated.

For all optical fiber ends, the optical fiber may be metallized 108 in at least two places within an optical package (not shown). The first location being where the optical fiber end is attached to be aligned with a diode laser (not shown). The second location may be at a feedthrough point of an optical package (not shown) to seal the optical package.

Typically, it is more efficient to metallized the entire optical fiber end as shown by ends 104 and 104' in FIGS. 1a and 1b. Partial metallization which exposes the bare cladding 114 as shown in FIGS. 1c and 1d may require a further processing step. This processing step may vary by, for example, the optical package, the optical source and the application and may not be efficient for manufacturing purposes.

Although FIGS. 1a-d illustrate an optical fiber having a metal coating, it is understood that the present invention may be practiced with any optical fiber having a coating such that absorbed non-confined light may damage the coating. For example, the coating may be acrylate, polyimide or carbon.

Although FIG. 1a illustrates a lensed tip 106 and a fiber buffer 110 and FIG. 1b illustrates a flat tip 112, it is to be understood that an optical fiber end may use any tip, including at least lensed and flat. The type and shape of a tip may depend on the optical source requirements and the application. Optical source requirements may include the type of optical source, such as a diode laser, the optical power of the optical source and an optical brightness. The optical brightness may further depend on the numerical aperture (NA) of the optical fiber. A fiber buffer may be used with any optical fiber.

A typical optical source is a diode laser. A diode laser typically includes confined and non-confined light. For example, a diode laser may have fast axis and slow axis power. In general, fast axis and slow axis power correspond to confined and non-confined light, respectively. An optical fiber tip may be lensed to improve the coupling of fast axis power from a diode laser to a multimode optical fiber. Even with lensing, however, some of the fast axis power may not be confined to the core of the optical fiber. In addition, slow axis power is typically not confined to the core and may also extend into the cladding.

Figure 2A:
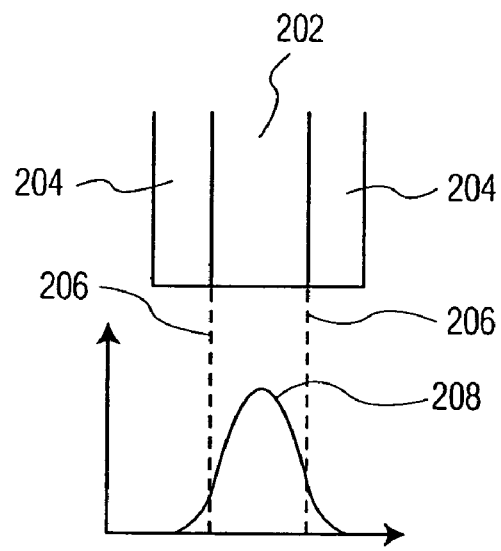
FIG. 2a (Prior Art) illustrates the relationship between fast axis power of a diode laser and transfer of the power into a multimode optical fiber end.
Figure 2B:
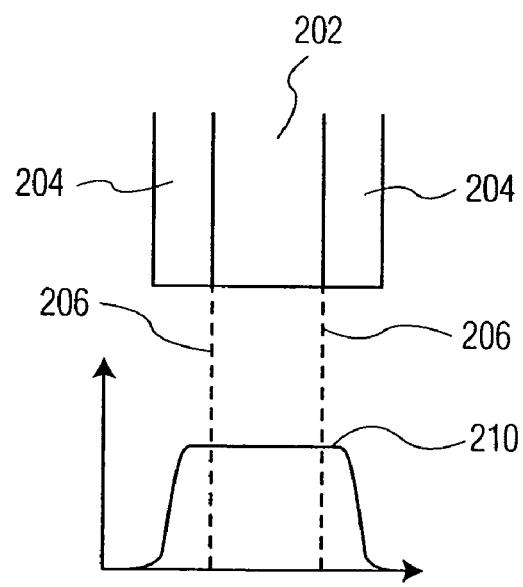
FIG. 2b (Prior Art) illustrates the relationship between slow axis power of a diode laser and transfer of the power into a multimode optical fiber end.

Referring now to FIGS. 2a and 2b, an example of coupling of fast axis and slow axis power, respectively, between a diode laser and a conventional multimode optical fiber is now described. A multimode optical fiber core 202 and cladding 204 are illustrated in FIGS. 2a and 2b. Although the example illustrates fast and slow axis power, it is understood that the relationship may be extended to any non-confined light situation.

FIG. 2a illustrates the fast axis power 208 from a diode laser in relationship to core 202 and cladding 204. It is assumed that the optical fiber is properly aligned with the diode laser. Lines 206 represent the acceptance cone of the fiber. The fast axis power is typically Gaussian-shaped. For the fast axis, the majority of the power 208 is-desirably within core 202. Only a small portion of the power at low amplitude escapes into the cladding. Thus the fast axis power typically does not propagate significantly in cladding 204.

FIG. 2b illustrates the slow axis power 210 from a diode laser in relationship to core 202 and cladding 204. It is assumed that the optical fiber is properly aligned with the diode laser. Lines 206 represent the acceptance cone of the fiber. For a multimode diode laser, the slow axis is typically the summation of a number of single-mode Gaussian power curves. Thus the slow axis power is typically as represented by curve 210. For the slow axis power, the majority of the power 208 typically occurs within core 202 and extends outside acceptance cone 206 into cladding 204. The slow axis power 210 that extends to cladding 204 may also be at a high power amplitude. Thus, the slow axis power 210 may not be confined to core 202 and may be coupled to or propagate through the cladding 204.

The non-confined light may propagate through cladding 204 as a cladding mode or may attempt to exit the cladding. However, at the fiber end, the cladding is coated (not shown in FIGS. 2a and 2b) and non-confined light that attempts to exit through the coating may cause localized heating due to absorption at the cladding-coating interface. The non-confined light may also be absorbed in a buffer region away from the coated optical fiber end as the non-confined light travels down the length of the optical fiber.

In general, confined light may be any light that is reflected or refracted within the fiber core. Non-confined light may either be absorbed at the cladding-coating interface or may escape through the coating. It is desirable to prevent absorption of the non-confined light at the cladding-coating interface.

Figure 3A:
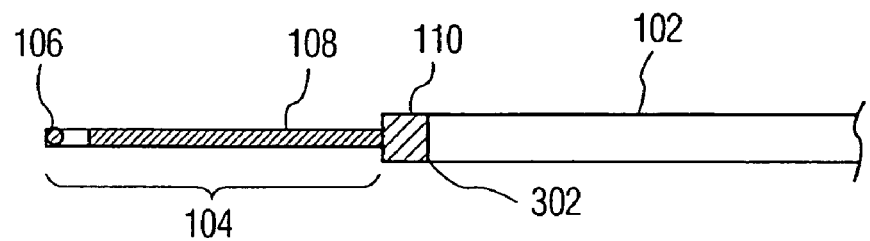
FIG. 3a is a side view illustrating damage to a coated fiber buffer along a conventional multimode coated optical fiber end due to absorbed non-confined light.
Figure 3B:
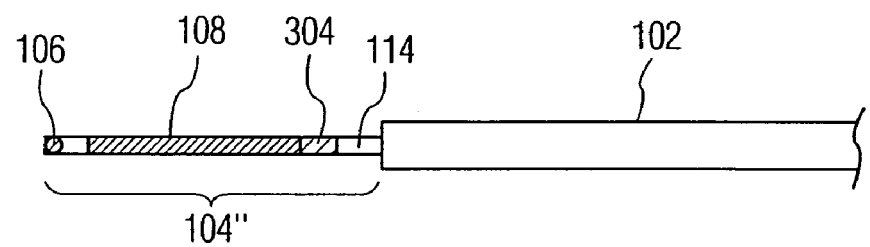
FIG. 3b is a side view illustrating damage to an end section of coating along a conventional multimode coating optical fiber end due to absorbed non-confined light.
Figure 3C:
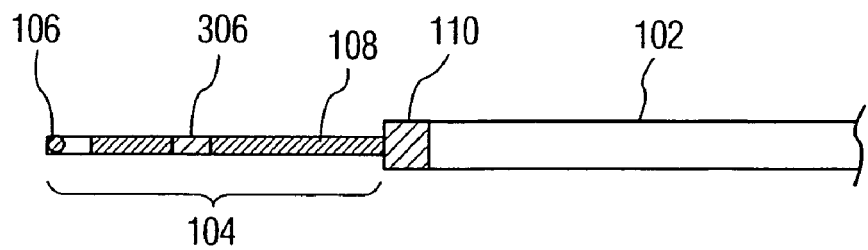
FIG. 3c is a side view illustrating damage to a portion of coating along a conventional multimode coated optical fiber end due to absorbed non-confined light.

Referring now to FIGS. 3a-c, damage along a coated optical fiber end of a conventional optical fiber caused by absorbed non-confined light is described. The inventors have determined that as the diode laser power increases or in high brightness situations the absorbed non-confined light may prove detrimental and cause damage to a conventional optical fiber coating. FIG. 3a illustrates damage 302 in a fiber buffer 110 region. FIG. 3b illustrates a conventional optical fiber end 104" having coating 108 removed to expose bare cladding 114. In this example, absorption damage 304 is shown in an end region of coating 108 of end 104". Hot spots caused by the absorbed non-confined light and thus potential damage may occur along any region of the fiber end, as illustrated in FIG. 3c with damage to coating 306.

Although the figures illustrate a region of fiber coating damage, multiple regions may occur both within fiber end 104 and fiber buffer region 110. Although a lensed tip 106 is shown, it is to be understood that fiber coating damage may occur with other types and shapes of fiber tips and coated fibers where the optical power is allowed to be non-confined to a multimode optical fiber core.

Exemplary optical fibers may have a 105 μm core and a 125 μm cladding. Exemplary optical fibers may further have a NA between 0.15 and 0.22. The inventors have determined that continuous wave (CW) diode laser power above 1 W in 0.15 NA multimode optical fiber may lead to localized hot spots. High optical power in excess of about 4 W from a single emitter may cause damage to an optical fiber coating.

In addition to high optical power, damage may also depend on optical brightness. For example, an optical fiber with a smaller NA may provide more problems with hot spots due to increased brightness compared with a larger NA. This in turn may lead to fiber, coating or epoxy (buffer material proximate to the optical fiber end) damage due to laser power absorption. It may also eventually cause catastrophic optical package failure. Such damage may initially start with discoloration of the coated portion of the fiber or the buffer material such as acrylate. However, the damage may then rapidly degrade the optical fiber and cause fiber breakage or bending that result in low output power and failure of the entire optical package.

There is also a relationship between the optical power and NA (brightness). As the drive current of the optical source increases and optical power increases, both the confined and non-confined optical power change. The non-confined optical power may start to fall outside of the acceptance cone of the fiber 206 (NA of core) and become coupled into the cladding with a smaller NA before occurring with a larger NA. Thus, a smaller NA may result in hot spots and potential fiber damage at a lower optical power than for a larger NA.

Within a typical optical package, the coated optical fiber is typically attached with solder at the two attachment points. These points may be a few millimeters apart. At the solder attachment points, the solder may be connected to a base of the optical package. Any heat that may be caused by the absorbed non-confined light in the cladding may be leaked out of through the solder connected to the base. Between the solder attachment points, the coating is typically very thin. The coating may not be able to propagate the heat build up and may thus lead to fiber damage between the solder connection points. It is understood that the coated optical fiber may be attached to the optical package at one attachment point or more than two attachment points.

Referring now to FIGS. 4*a*-*e*, embodiments of the present invention are described. To reduce optical fiber damage, an aperture patterned coating may desirably be provided to an end of optical fiber 402. According to an exemplary embodiment of the present invention, apertures arranged in a pattern may desirably be provided in the coating to allow non-confined light typically absorbed to escape through the apertures in the coating. Reduced absorption of the non-confined light is desirably provided and hot spots and thus damage to the optical fiber may be avoided.

Figure 4A:
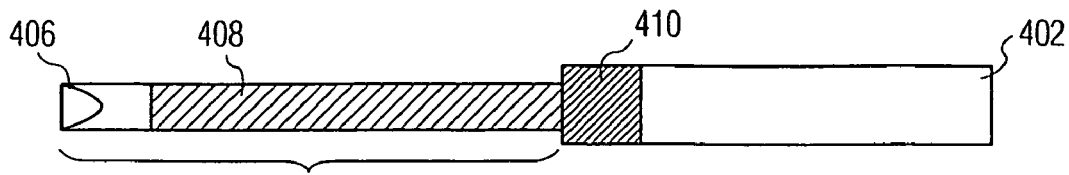
FIG. 4a is a side view of a first exemplary aperture patterned coated optical fiber end according to the present invention.

FIG. 4*a* illustrates an exemplary embodiment of the present invention with an aperture patterned coating 408 provided along the length of optical fiber end 404 of optical fiber 402. The aperture patterned coating 408 of the exemplary embodiment is desirably a removal of the coating in a helix along the length of the fiber end 404.

It is to be understood that an exemplary embodiment of the present invention may also include a removal of the coating in a plurality of grooves at an angle relative to the length of optical fiber 402. It is to be further understood that each groove may or not extend completely around the circumference of the fiber end 404. For example, the coating may be removed with a laser after placement of the optical fiber end 404 in an optical package (not shown). A laser may not be able to remove the coating underneath the optical fiber end 404. It is contemplated that a laser may remove the coating underneath the optical fiber by ablating the coating through the optical fiber. Thus the grooves of aperture patterned coating 408 may or may not continue along the bottom of optical fiber end 404.

Figure 4B:
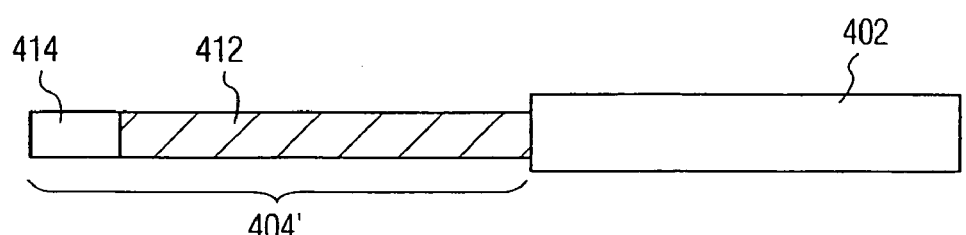
FIG. 4b is a side view of a second exemplary aperture patterned coated optical fiber end according to the present invention.

In this embodiment a lensed tip 406 and fiber buffer 410 are shown. It is understood that aperture patterned coating 408 may be applied to any type of multimode fiber where absorption of non-confined light may cause fiber damage. Aperture patterned coating 408 may be applied to a portion of fiber end 404. Optical fiber 402 may have a lensed tip 406, flat tip 414 as shown in FIG. 4*b* or any other type of tip as determined by at least an optical source, an optical fiber, an optical package, an application or any combination therein. Additionally, optical fiber 402 may not have a fiber buffer 410 as shown in the further embodiments of FIGS. 4*b*-*c*.

FIG. 4*b* illustrates a second exemplary embodiment of the present invention with aperture patterned coating 412 provided along the length of optical fiber end 404' of optical fiber 402. Aperture patterned coating 408 of the exemplary embodiment is a removal of the coating in a plurality of circumferential grooves along the length of the fiber end 404. In this second exemplary embodiment, patterned coating 412 are arranged in grooves that are normal to the length of the optical fiber 402.

It is to be understood that each groove may not extend completely around the circumference of the fiber end 404'. As described above, the coating may be removed after placement of the optical fiber end 404' in an optical package (not shown). Thus the grooves of aperture patterned coating 412 may or may not continue along the bottom of optical fiber end 404'.

In this second exemplary embodiment a flat tip 414 is shown. It is understood that aperture patterned coating 412 may be applied to any type of multimode fiber where non-containment of optical power may cause fiber damage. Aperture patterned coating 412 may be applied to only a portion of fiber end 404'. The second exemplary embodiment may further include a fiber buffer 410. The second exemplary embodiment may be practiced with other types of tips including lensed tip 406, as determined by at least an optical source, an optical fiber, an optical package, an application or any combination therein.

Figure 4C:
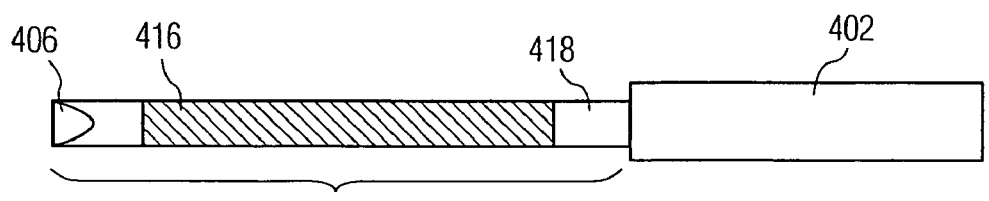
FIG. 4c is a side view of a third exemplary aperture patterned coated optical fiber end according to the present invention.

FIG. 4*c* illustrates a third exemplary embodiment of the present invention with aperture patterned coating 416 provided along a portion of optical fiber end 404" of optical fiber 402. Aperture patterned coating 416 of the third exemplary embodiment is a removal of the coating in a plurality of polygon or oval shaped apertures along a portion of fiber end 404".

The plurality of apertures of aperture patterned coating 416 are illustrated as regularly spaced circular apertures. It is to be understood that the apertures may be of any polygon shape, and that they may further be randomly spaced.

Figure 4D:
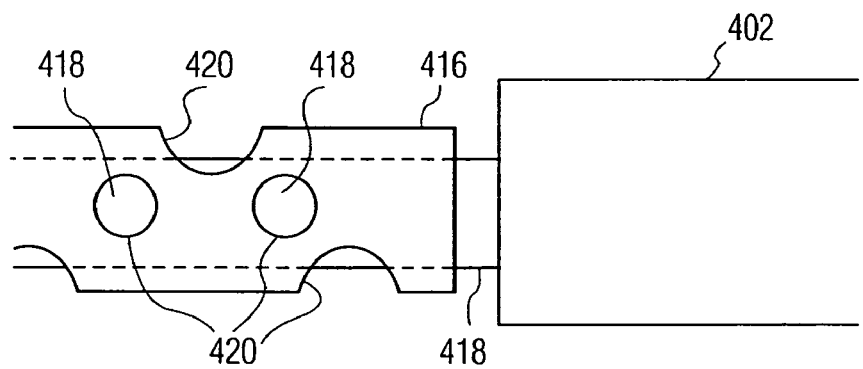
FIG. 4d is a section view of the third exemplary aperture patterned coated optical fiber end according to the present invention.

FIG. 4*d* illustrates a section view of the third exemplary embodiment of the present invention. A portion of aperture patterned coating 416 of optical fiber 402 surrounds cladding 418. Apertures 420 are provided in the coating to expose cladding 418. Apertures 420 are illustrated as oval shaped with random spacing. However, apertures 420 may be of any shape and may further be regularly spaced.

It is to be understood that apertures provided in the coating may not extend completely around the circumference of the fiber end 404". As described above, the coating may be removed after placement of the optical fiber end 404" in an optical package (not shown). Thus the apertures may or may not be provided along the bottom of optical fiber end 404".

In the third exemplary embodiment illustrated in FIG. 4c, a portion 418 of the optical fiber end 404" is bare cladding. It is to be understood that the coating may extend the length of the optical fiber end 404". It is further understood that the aperture patterned coating 416 may be applied to any type of multimode fiber where non-containment of optical power may cause fiber damage. The third exemplary embodiment may further include a fiber buffer 410. Although the third embodiment is shown with a lensed tip 406, the invention may be practiced with other types of tips including flat tip 414, or any other type of tip as determined by at least an optical source, an optical fiber, an optical package, an application or any combination therein.

Figure 4E:
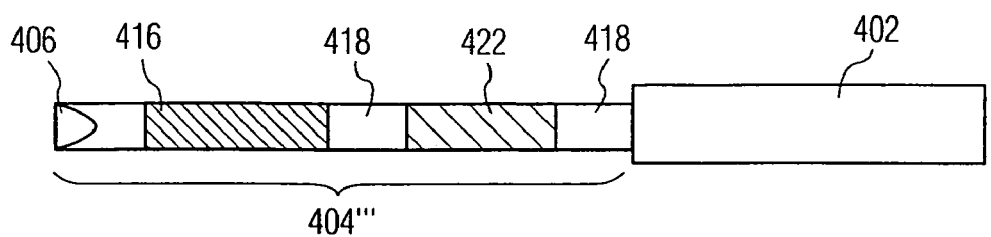
FIG. 4e is a side view of a fourth exemplary aperture patterned coated optical fiber end according to the present invention.

FIG. 4e illustrates a fourth exemplary embodiment of the present invention with a two different aperture patterned coatings 416 and 422 provided along portions of optical fiber end 404''' of optical fiber 402. Aperture patterned coating 416 is described above. Aperture patterned coating 422 of the fourth exemplary embodiment is another example of removal of the coating in a plurality of polygon shaped apertures along a portion of fiber end 404''' according to a regular pattern.

The plurality of apertures of aperture patterned coating 422 are illustrated as regularly spaced square apertures arranged in a checkerboard pattern. It is to be understood that the apertures may be of any polygon shape. Although the fourth exemplary embodiment illustrates two types of polygon shaped aperture patterns, it is understood that a combination of grooves as shown in FIGS. 4a and 4b and polygons as shown in FIGS. 4c and 4e may be provided according to the present invention.

Although FIG. 4e illustrates two regions of aperture patterned coatings and two regions of bare cladding 418, it is understood that any number of aperture patterned coating regions and bare cladding regions may be present, provided that there is coating in locations for attaching the optical fiber end 404''' to an optical package as discussed above. It is further understood that any number of types of aperture patterned coated areas may be combined without separation by bare cladding 418.

It is to be understood that the polygon shaped apertures provided in the coating may not extend completely around the circumference of the fiber end 404'''. As described above, the coating may be removed after placement of the optical fiber end 404''' in an optical package (not shown). Thus the polygon shaped apertures may or may not be provided along the bottom of optical fiber end 404'.

In the fourth exemplary embodiment illustrated in FIG. 4e, multiple portions 418 along optical fiber end 404" are bare cladding. It is to be understood that the coating may extend the length of the optical fiber end 404'''. It is further understood that the patterned coating 416 may be applied to any type of multimode fiber where non-containment of optical power may cause fiber damage. The fourth exemplary embodiment may further include a fiber buffer 410. Although the fourth exemplary embodiment is shown with a lensed tip 406, the invention may be practiced with other types of tips including flat tip 414, or any other type of tip as determined by at least an optical source, an optical fiber, an optical package, an application or any combination therein.

Although the first through fourth exemplary embodiments do not illustrate coating covering a portion of fiber tip 406 or 414, it is to be understood that a coating may extend up to a fiber tip.

Although FIGS. 4a-e illustrate some sample shapes, it is contemplated that the any shape may be provided to remove the coating and allow the escapement of absorbed non-confined light.

The type of pattern and placement on a fiber end may depend at least upon the type of application, NA of a fiber core, optical source power and optical package and attachment points within an optical package. Thus, the exemplary embodiments of the present invention may provide flexibility in developing an optical fiber to optical package attachment with reduced fiber damage at higher powers or brightness situations suitable for a particular application.

Figure 5:
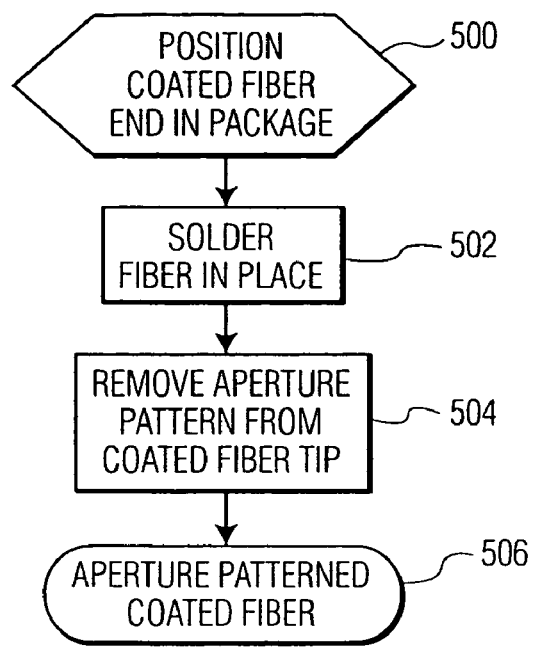
FIG. 5 is a flowchart illustrating an exemplary method of post-processing a coated fiber to provide an aperture patterned coated optical fiber, according to the present invention.

Referring now to FIG. 5, an exemplary method of post-processing an optical fiber to provide an exemplary optical fiber end according to the present invention is described. In step 500, a common in the art coated fiber end may be positioned in an optical package according to at least an optical source and optical package. In step 502, the coated optical fiber end may be attached with solder at least where coating is disposed on the optical fiber end for precisely aligning the fiber end with an optical source.

In step 504, an aperture based pattern is removed from the attached optical fiber according to an embodiment of the present invention. A laser may desirably ablate portions of the coating to expose bare cladding according to exemplary aperture patterns as described above to provide, in step 506, a finished aperture patterned coated optical fiber according to an embodiment of the present invention. It is contemplated that chemical or mechanical means may be provided to remove portions of the coating.

The exemplary method of post-processing an optical fiber as described above provides advantages over usage of a common in the art optical fiber. A common in the art coated optical fiber may be attached as desired for at least a particular application, optical package and optical source without requiring a specialized selection of an optical fiber. After the optical fiber is attached, a laser may remove portions of the coating dependent on at least the particular optical source and application. Thus, a special fiber dependent on at least the optical package and optical source is not required. Further, an aperture patterned coated optical fiber may further reduce the risk of absorbed non-confined optical power creating hot spots and potentially damaging the optical fiber. Thus, the life of the optical fiber and the device to which the optical fiber is attached may be extended.

Although not shown, it is to be understood that an aperture patterned coating may be applied during optical fiber manufacture, according to an embodiment of the present invention after a coating is applied to the optical fiber. Thus, according to optical fiber manufacturing, a core may be provided and a cladding may be formed around the core. A coating may be applied to at least a portion of the cladding at an end of the optical fiber. A laser may then remove portions of the coating according to an embodiment of the present invention. Thus, an aperture patterned coating may be formed in the optical fiber manufacturing process after coating is applied. It is contemplated that chemical or mechanical means may be provided to remove portions of the coating.

Figure 6:
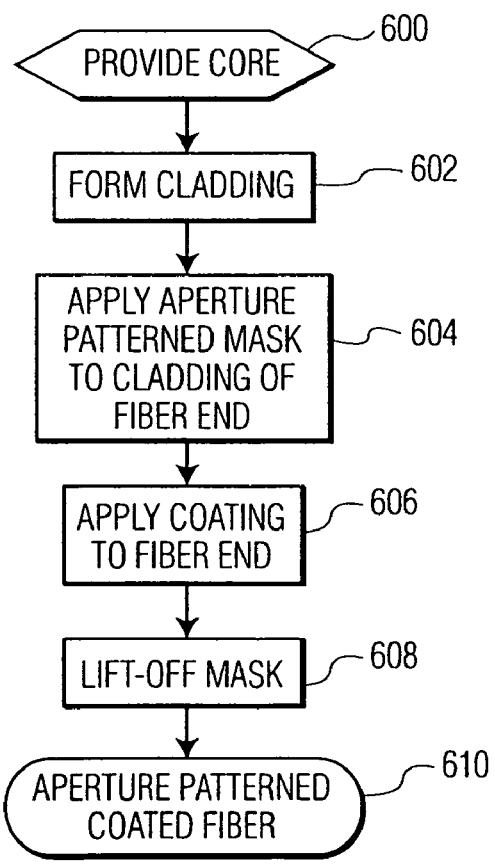
FIG. 6 is a flowchart illustrating an exemplary method of aperture patterned coated optical fiber manufacture, according to the present invention.

Referring now to FIG. 6, an exemplary method of manufacturing an exemplary optical fiber according to the present invention is now described. In step 600 an optical fiber core having a refractive index may be provided by common in the art methods. In step 602, a cladding may be formed around the cladding by common in the art methods. The cladding may have a refractive index less than the refractive index of the core.

In step 604, an aperture patterned mask is desirably applied around the cladding of at least a portion of a fiber end. A patterned mask may be wrapped around the cladding. The aperture patterned mask may be provided as described above according to exemplary embodiments of the present invention.

In step 606, a coating is desirably applied to at least a portion of the cladding of the optical fiber end as described above to provide a coated optical fiber cladding end. In step,608, mask lift-off is performed, where the aperture patterned mask applied in step 604 is removed from the portion of the fiber end, thus providing the aperture patterned coated fiber of step 610 and exposing the cladding through the aperture patterns in the coating.

Figure 7:
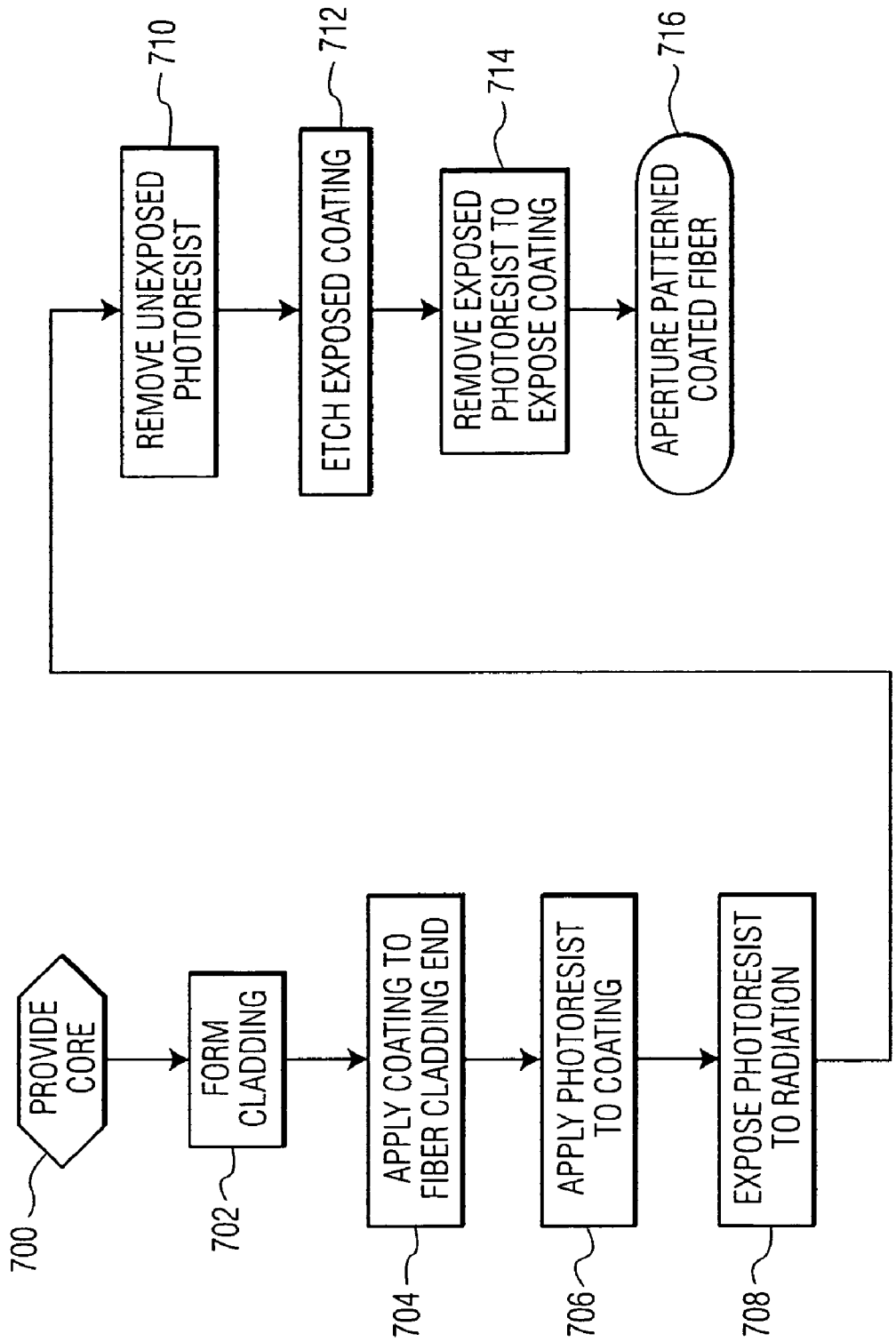
FIG. 7 is a flowchart illustrating an alternate exemplary method of aperture patterned coated optical fiber manufacture, according to the present invention.

Referring now to FIG. 7, an alternate exemplary method of manufacturing an exemplary optical fiber according to the present invention is now described. In step 700, an optical fiber core having a refractive index may be provided. In step 702, a cladding may be formed around the cladding. The cladding may have a refractive index less than the refractive index of the core. In step 704, a coating is desirably applied to at least a portion of the cladding at an optical fiber end as described above to provide a coating of an optical fiber end.

In step 706, a photoresist is applied to the coating. In step 708, the photoresist is desirably exposed to at least a portion of radiation according to an aperture patterned mask as described in the exemplary embodiments of the present invention. In step 710, the unexposed photoresist may be removed. In step 712, coating exposed from under the removed unexposed photoresist may be etched. In step 714, exposed photoresist is removed to expose the coating, thus providing the aperture patterned coated fiber of step 716.

As described above in the exemplary methods of manufacture, an aperture patterned coated optical fiber may be manufactured by: a) pre-masking the optical cladding, b) chemical processing of the optical fiber using an aperture patterned masked radiation or c) remove portions of the coating after the coating is applied to provide an aperture patterned coating. Alternatively, post-processing of a common in the art coated fiber may be provided after the optical fiber is attached to an optical package by laser ablating the coating to form an aperture patterned coating.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An optical fiber comprising:
a core having a first index of refraction;
a cladding surrounding the core and having an index of refraction less than the index of refraction of the core; and
a coating covering the cladding located in a segment proximate to an end of the optical fiber and having patterned apertures such that a portion of light propagating into the cladding escapes through the patterned apertures of the coating,
wherein the patterned apertures are located circumferentially around the optical fiber and tend to reduce absorption of the portion of light by the coating.

2. The optical fiber according to claim 1, wherein the patterned apertures include at least one circumferential groove formed in the coating.

3. The optical fiber according to claim 2, wherein the optical fiber has a length and a central axis along the length and the at least one circumferential groove is arranged at an angle to the central axis.

4. The optical fiber according to claim 3, wherein the at least one circumferential groove is a plurality of grooves.

5. The optical fiber according to claim 3, wherein the at least one circumferential groove is a helical groove.

6. The optical fiber according to claim 1, wherein the patterned apertures are polygonal shaped.

7. The optical fiber according to claim 6, wherein the patterned apertures are arranged symmetrically to correspond to non-confined light of a laser beam transmitted through the optical fiber.

8. The optical fiber according to claim 7, wherein the patterned apertures are arranged in a random pattern to correspond to said non-confined light of a laser beam transmitted through the optical fiber.

9. An optical fiber for receiving light from a source of light, the optical fiber comprising:
an optical fiber core having an end for receiving light from the source of light and having a first index of refraction;
a cladding surrounding the optical fiber core having an index of refraction less than the index of refraction of the optical fiber core; and
a coating covering the cladding in a segment proximate to the end of the optical fiber and having patterned apertures,
wherein the patterned apertures are configured circumferentially around the optical fiber and to allow a portion of the light to escape through the coating such that reduced absorption of the portion of light occurs in the coating.

10. The optical fiber according to claim 9, wherein the source of light transmits confined light and non-confined light.

11. The optical fiber according to claim 10, wherein the patterned apertures are configured to allow non-confined light to escape through the patterned apertures of the coating.

12. The optical fiber according to claim 10, wherein the end of the optical fiber is lensed to provide focusing of the confined light.

* * * * *